United States Patent
Petrini et al.

(10) Patent No.: US 9,384,669 B2
(45) Date of Patent: Jul. 5, 2016

(54) METHOD AND ARRANGEMENT FOR ESTIMATING AT LEAST ONE PARAMETER OF AN INTRUDER

(75) Inventors: Erik Petrini, Stockholm (SE); Bengt-Göran Sundqvist, Linköping (SE); Andreas Persson, Linköping (SE); Johan Pellebergs, Linköping (SE)

(73) Assignee: SAAB AB, Linköping (SE)

( * ) Notice: Subject to any disclaimer, the term of this patent is extended or adjusted under 35 U.S.C. 154(b) by 512 days.

(21) Appl. No.: 12/641,353

(22) Filed: Dec. 18, 2009

(65) Prior Publication Data
US 2011/0169945 A1    Jul. 14, 2011

(30) Foreign Application Priority Data
Dec. 19, 2008    (EP) .................................. 08172260

(51) Int. Cl.
*H04N 7/18* (2006.01)
*G06K 9/00* (2006.01)
(Continued)

(52) U.S. Cl.
CPC .............. *G08G 5/0078* (2013.01); *G06T 7/004* (2013.01); *G08G 5/0021* (2013.01); *G08G 5/045* (2013.01); *G01S 3/7864* (2013.01);
(Continued)

(58) Field of Classification Search
CPC ...... G01B 11/022; G01B 11/024; H04N 7/18; H04N 7/181; G01C 15/00
USPC .................................................. 348/135, 156
See application file for complete search history.

(56) References Cited

U.S. PATENT DOCUMENTS

| | | | | |
|---|---|---|---|---|
| 2,994,867 | A | * | 8/1961 | Pierce .............................. 342/29 |
| 5,554,983 | A | * | 9/1996 | Kitamura et al. ............. 340/937 |

(Continued)

FOREIGN PATENT DOCUMENTS

DE    102006039104 A1    1/2008

OTHER PUBLICATIONS

Andreas Wedel et al.; "Realtime Depth Estimation and Obstacle Detection from Monocular Video"; DAGM 2006; vol. 4174; pp. 475-484.

(Continued)

*Primary Examiner* — Jessica M Prince
*Assistant Examiner* — On S Mung
(74) *Attorney, Agent, or Firm* — Venable LLP; Michael A. Sartori; Eric J. Franklin (57) ABSTRACT

A method for estimating, from a platform, at least one parameter of an intruder. Consecutive frames of image data at different times of the intruder utilizing at least one passive sensor are generated. A direction from the platform to the intruder is determined based on the generated consecutive frames of image data. A time period remaining until a potential collision between the platform and the intruder is estimated. An angular extent of the intruder, as viewed by the passive sensor, is estimated based on the image data. At least one of a first relative location vector to a minimum intruder associated with the intruder or a second relative location vector to a maximum intruder associated with the intruder is estimated. An arrangement for generating input data to a sense-and-avoid system on-board a platform, a computer program, a computer program product and a platform carrying the arrangement are also provided.

18 Claims, 5 Drawing Sheets

(51) Int. Cl.
  G01S 13/00 (2006.01)
  G08G 5/00 (2006.01)
  G06T 7/00 (2006.01)
  G08G 5/04 (2006.01)
  G01S 3/786 (2006.01)
(52) U.S. Cl.
  CPC ........... G06T 2207/10016 (2013.01); G06T 2207/30212 (2013.01); G06T 2207/30261 (2013.01); H04N 7/18 (2013.01)

(56) References Cited

U.S. PATENT DOCUMENTS

| | | | | |
|---|---|---|---|---|
| 6,057,909 | A * | 5/2000 | Yahav et al. | 356/5.04 |
| 6,510,388 | B1 * | 1/2003 | Sporrong et al. | 701/301 |
| 6,975,246 | B1 * | 12/2005 | Trudeau | 340/903 |
| 7,002,510 | B1 * | 2/2006 | Choate et al. | 342/118 |
| 2002/0133294 | A1 * | 9/2002 | Farmakis et al. | 701/301 |
| 2002/0134151 | A1 | 9/2002 | Naruoka et al. | |
| 2002/0152029 | A1 * | 10/2002 | Sainthuile et al. | 701/301 |
| 2003/0146869 | A1 * | 8/2003 | Lin et al. | 342/357.14 |
| 2007/0075893 | A1 * | 4/2007 | Filias et al. | 342/104 |
| 2007/0210953 | A1 | 9/2007 | Abraham et al. | |
| 2008/0021647 | A1 * | 1/2008 | Daveze et al. | 701/301 |
| 2009/0119044 | A1 * | 5/2009 | Levesque et al. | 702/69 |
| 2009/0201486 | A1 * | 8/2009 | Cramblitt et al. | 356/4.01 |
| 2009/0259402 | A1 * | 10/2009 | Gates et al. | 701/301 |
| 2009/0293012 | A1 * | 11/2009 | Alter et al. | 715/810 |

OTHER PUBLICATIONS

Plamen Angelov et al.; "A Passive Approach to Autonomous Collision Detection and Avoidance in Uninhabited Aerial Systems"; IEEE, Apr. 2008; pp. 64-69.
European Search Report—May 13, 2009.

* cited by examiner

METHOD AND ARRANGEMENT FOR ESTIMATING AT LEAST ONE PARAMETER OF AN INTRUDER

CROSS-REFERENCE TO RELATED APPLICATIONS

This application claims priority to European patent application 08172260.5 filed 19 Dec. 2008.

TECHNICAL FIELD

The present invention relates to an arrangement and method for estimating, from a platform, at least one parameter, such as range to and relative velocity of an intruder. In particular the invention relates to an arrangement and method for generating input data to a sense-and-avoid system onboard a platform. The invention also relates to a computer programme and a computer programme product. The invention also relates to a platform carrying the arrangement.

BACKGROUND ART

Today various platforms, such as aircraft, are provided with anti-collision systems for avoiding collisions with other objects in the environment of the own-ship. These systems are designed to detect other objects who may themselves be platforms, also referred to as intruders, determine how to avoid a future possible collision and, when necessary, provide guidance to avoid the possible collision by manoeuvring the platform in such a way a safe generated escape path is followed.

In the field of avionics so called sense-and-avoid-systems (S&A-systems) are known. These differ from present anti-collision systems in that they can directly and automatically control the aircraft. These are currently in the early stages of development, and there exists a need for improving reliability, accuracy and overall performance of such systems, not at least from a flight safety point of view.

Also, in the field of avionics, high standards have been set regarding aircraft equipment certification criterion. This will particularly hold true in the case that the aircraft is an UAV (Unmanned Aerial Vehicle).

SUMMARY OF THE INVENTION

There is an object of the invention to provide an improved method and arrangement for estimating parameters of an intruder.

There is another object to provide a robust method and arrangement for estimating parameters of an intruder.

There is also an object of the invention to provide an alternative method and arrangement for estimating parameters of an intruder.

Yet another object of the invention is to provide a method and arrangement for providing accurate input data to a sense-and-avoid system onboard a platform, such as an own-ship.

Still yet another object of the invention is to provide a method and arrangement for providing enhancing ability to survive for an own-ship.

By using a passive sensor for generating consecutive frames of image data at different times, a low cost method for generating at least one parameter of the intruder is achieved.

The method may further comprise the step of:
determining a relative location vector interval to the intruder on the basis of said first relative location vector and said second relative location vector. In this way an estimation about an interval within which the intruder is located is achieved.

The method may further comprise the step of:
estimating a first speed vector of the minimum intruder; and/or
estimating a second speed vector of the maximum intruder.

By estimating a speed vector of the minimum and/or maximum intruder more complete information may be provided as input to a sense-and-avoid system onboard the platform, which may be beneficial in a process determining a fly-away path.

The method may further comprise the step of:
providing at least one of the first relative location vector and said second relative location vector to a sense and avoid system onboard the platform so as to prevent a collision between said platform and said intruder. On the basis of at least one relative location vector the sense and avoid system of the platform may determine a suitable escape path and control the platform such that a future possible collision between said platform and said intruder is avoided. In case the platform is an aircraft a suitable fly-away path may be determined.

The method may further comprise the step of:
estimating said first relative location vector to a minimum intruder on the basis of a predetermined width associated with the minimum intruder, a smallest angular extent for which the passive sensor can detect an object, and said estimated angular extent of the intruder. This allows to estimate said first relative location vector in a time effective and reliable way.

The method may further comprise the step of:
estimating said second relative location vector to the maximum intruder on the basis of said estimated time period remaining until a potential collision between the platform and intruder. This allows to estimate said second relative location vector in a time effective and reliable way.

The method may further comprise the step of:
estimating said second relative location vector to the maximum intruder on the basis of a predetermined maximum width of intruders and said estimated angular extent of the intruder. This allows to estimate said second relative location vector in a time effective and reliable way.

An aspect of the invention also relates to a computer programme comprising a programme code for, from a platform, estimating at least one parameter of an intruder, when said computer programme is run on a computer.

An aspect of the invention relates to a computer programme product comprising a program code stored on a, by a computer readable, media for, from a platform, estimating at least one parameter of an intruder, when said computer programme is run on a computer.

An aspect of the invention relates to an arrangement for estimating, from a platform, at least one parameter of an intruder, comprising:
means for generating consecutive frames of image data at different times of said intruder by means of at least one passive sensor;
means for determining a direction from the platform to the intruder on the basis of the generated consecutive frames of image data;
means for estimating a time period remaining until a potential collision between the platform and intruder;
means for estimating an angular extent of the intruder, as viewed by the passive sensor, on the basis of the image data; and means for estimating a first relative location vector to a minimum intruder associated with the intruder; and/or means for estimating a second relative location vector to a maximum intruder associated with the intruder.

The arrangement may further comprise means for determining a relative location vector interval to an intruder on the basis of said first relative location vector and said second relative location vector.

The arrangement may further comprise means for estimating a first speed vector of the minimum intruder; and/or means for estimating a second speed vector of the maximum intruder.

The arrangement may further comprise means for providing at least one of the first relative location vector and said second relative location vector to a sense and avoid system onboard the platform so as to prevent a collision between said platform and said intruder.

An aspect of the invention relates to a platform, such as an aircraft, watercraft spacecraft or ground vehicle, having an arrangement for estimating, from a platform, at least one parameter of an intruder.

BRIEF DESCRIPTION OF THE DRAWINGS

For a more complete understanding of the present invention and further objects and advantages thereof, reference is now made to the examples shown in the accompanying drawings, wherein like reference characters refer to like parts throughout the several views, and in which.

DETAILED DESCRIPTION

Figure 1A:
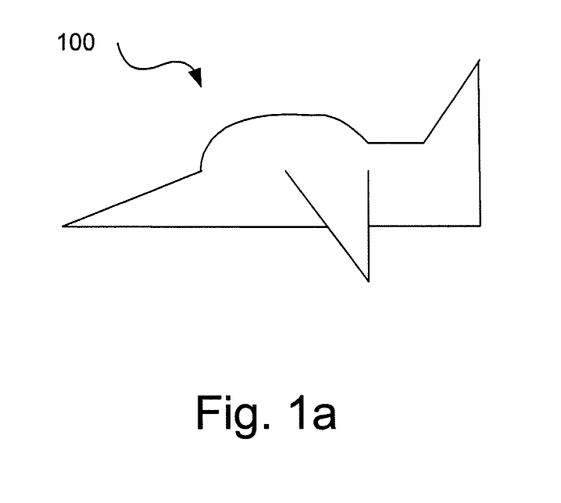
FIG. 1a schematically illustrates a platform in the form of an aircraft according to an aspect of the present invention.

With reference to FIG. 1a there is depicted a platform 100 according to an aspect of the invention. Herein the platform 100 is exemplified by an aircraft, The aircraft may be a fighter, bomber, surveillance aircraft, or a combination thereof. The aircraft may be a commercial civilian aircraft, such as an airliner, or utility aircraft. The aircraft may be engine powered or a glider. The aircraft may be manned or unmanned. The aircraft may be fixed-wing, inflatable-wing, ornitohopter, rotary wing or a combination thereof. The platform 100 may alternatively be a satellite, space-shuttle, rocket or missile. The platform may even be stationary.

However, even though the arrangement and method according to the invention is applicable in the field of aviation, it should be noted that it alternatively may be applied to various platforms, such as watercrafts, e.g. sub-marines, ships or motorboats. Alternatively, the arrangement and method according to the present invention may be applied to ground vehicles, such as automobiles.

Figure 1B:
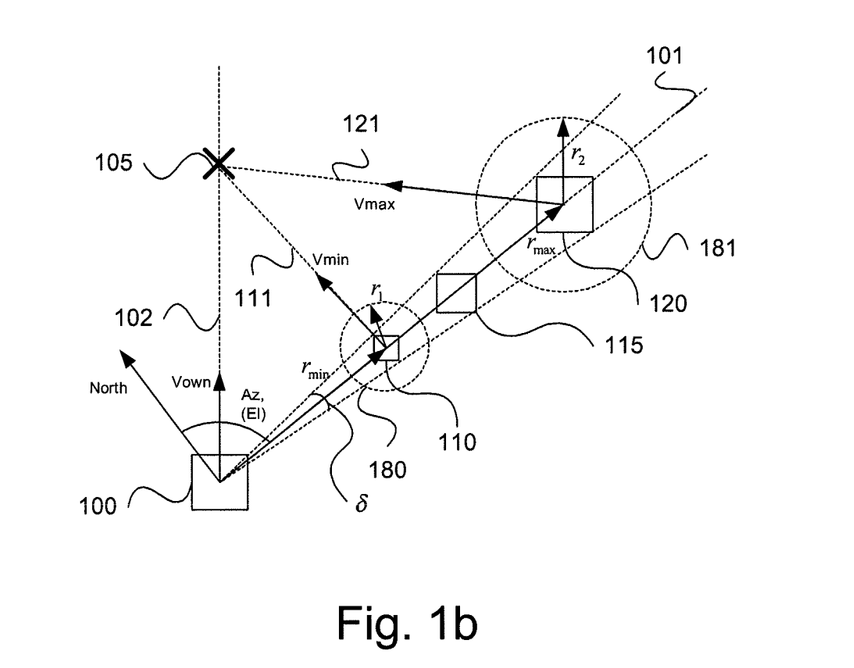
FIG. 1b schematically illustrates a flight situation.

With reference to FIG. 1b there is illustrated a possible flight situation seen from above in 2-D, wherein an own-ship platform is denoted by a reference number 100. The platform 100 is the same platform 100 depicted with reference to FIG. 1a.

There are also illustrated two representations of an intruder 115, namely a first intruder representation 110 and a second intruder representation 120. The two intruder representations 110 and 120 are representations of one actual intruder 115 which is located in the environment of the platform 100. The representation 110 is referred to as the minimum intruder and the representation 120 is referred to as the maximum intruder. It is possible to determine the bearing to the intruder 115 relative the platform 100 by means of one or more generated images of a passive sensor on-board the platform 100. The bearing is a direction. This means that it is possible to determine an azimuth angle and an elevation angle from the platform 100 to the intruder 115. However, the range between the platform 100 and the intruder 115 may not directly be determined by the generated images, but only the bearing from the platform 100 and the intruder 115. The intruder 115 is actually located somewhere on an axis 101 given by the azimuth angle Az and the elevation angle El.

According to an aspect of the present invention a first representation 110 of the actual intruder 115 is illustrated. This first representation is corresponding to a closest possible location of the intruder 115 along the axis 101. The first representation 110 is a representation related to a first fictive situation where the actual intruder 115 is assumed to be located at a minimum range $r_{min}$. There is illustrated a volume 180 surrounding the first representation 110. The volume 180 having an extent $r_1$ is an indication of the uncertainty of measurement of the position of the intruder 115. The first representation 110 is associated with a minimum intruder velocity $\vec{v}_{min}$. The minimum intruder velocity $\vec{v}_{min}$ may be determined according to an aspect of the invention.

According to an aspect of the present invention a second representation 120 of the actual intruder 115 is illustrated. This second representation 120 is corresponding to a most distant possible location of the intruder 115 along the axis 101. The second representation 120 is a representation related to a second fictive situation where the actual intruder 115 is assumed to be located at a maximum range $r_{max}$. There is illustrated a volume 181 surrounding the second representation 120. The volume 181 having an extent $r_2$ is an indication of the uncertainty of measurement of the position of the intruder 115. The second representation 120 is associated with a maximum intruder velocity $\vec{v}_{min}$. The maximum intruder velocity $\vec{v}_{min}$ may be determined according to an aspect of the invention.

A speed $v_{own}$ of the platform 100 may be determined on-board the platform in any conventional manner. In this example the platform 100 is moving along a straight flight path denoted 102 in FIG. 1b.

A location of a potential future collision point 105 is illustrated in FIG. 1b. Such a location 105 may be determined by calculating a time period TTG (Time to Go) on basis of at least two images, and considering $v_{own}$.

δ is the angular extent of viewed intruder 115. δ may be described by width angle, height angle, solid angle or similar measure. Accordingly, δ is also corresponding to the different sizes if the minimum and maximum intruders.

Time-to-go (TTG) is determined by any known method by using two or more images. One known such method is to analyze the change in size of the intruder between two collected images in relation to the time passed. TTG may alternatively be obtained by applying a filter such as an Extended Kalman Filter to the measurements of the image sensor.

The range from the platform to the minimum- and maximum intruders is estimated by:

$$r_{min} = \min\left(\frac{b_{min}}{\delta_{pixel}}, \frac{b_{min}}{\delta_{measured}}\right), \text{ and}$$

$$r_{max} \leq TTG \cdot v_{closure}.$$

$b_{min}$ is chosen as the width of the minimum intruder that the sense-and-avoid system considered must avoid. $\delta_{pixel}$ is the smallest angular extent for which the sensor can detect an object (e.g. one pixel in a Charge Coupled Device (CCD)). $\delta_{measured}$ is the measured angular extent of the intruder.

$v_{closure}$ may be estimated (using cosine theorem) as:

$$Az_{rel} = \chi - Az$$

$$vhcaz = v_{own} \cos(Az_{rel})$$

$$v_{closure} = vhcaz + \sqrt{vhcaz^2 + v_{i,max}^2 - v_{own}^2}$$

Az is the measured azimuth angle (in a NED system) to the intruder. $\chi$(chi) is the track angle of the platform in a NED system. $v_{own}$ is the ground speed of the platform 100. $v_{i,max}$ is the maximum allowed speed of an aircraft in the occupied airspace and is given by the requirements on the sense-and-avoid system in question.

$v_{closure}$ may optionally be taken as a conservative approximation instead of using the cosine theorem.

The calculation of $v_{closure}$ may also be made more general to exclude the inherent assumption of formulae above that the geometry is mainly 2-D.

The range to the maximum intruder $r_{max}$ may alternatively be calculated as:

$$r_{max,alternate} = \frac{b_{max}}{\delta_{measured}}.$$

where $b_{max}$ is chosen as the maximum width of intruders that the sense-and-avoid system considered must avoid. A further variation is to select the minimum of $r_{max,alternate}$ and $r_{max}$ to provide a better range estimate for the intruder 115.

The relative position of the minimum- and maximum intruders relative the platform is given by:

$$x = r \cos(Az)\cos(El)$$

$$y = r \sin(Az)\cos(El)$$

$$z = -r \sin(El),$$

Where r is set to be $r_{min}$, and $\vec{r}_{max}$, respectively. El is the measured angle (in a NED system) to the intruder. The relative location vector formed by x, y and z for $r_{min}$ is $\vec{r}_n$ and the vector formed by x, y and z for $r_{max}$ is $\vec{r}_{max}$.

A spherical position uncertainty related to respective minimum- and maximum intruders is set as:

$$u(\vec{r}) = r\sqrt{u(Az)^2\cos^2(El) + u(El)^2}$$

Where r is set to be $r_{min}$ and $r_{max}$, respectively. u(Az) and u(El) are estimates of the uncertainties in the measurements of Az and El, respectively. $u(\vec{r})$ is an approximation where TTG uncertainty has been omitted. TTG uncertainty may be included for less approximation.

The velocity $\vec{v}_{min}$ may be determined according to an aspect of the invention. By image processing at least two successive images generated by a passive sensor on-board the platform 100 an estimate of the velocity $\vec{v}_{min}$ of the first representation 110 of the intruder 115 may be generated. In this example the first representation 110 of the intruder is moving along a straight flight path denoted 111 in FIG. 1b.

The velocity $\vec{v}_{max}$ may be determined according to an aspect of the invention. By image processing at least two successive images generated by a passive sensor on-board the platform 100 an estimate of the velocity $\vec{v}_{max}$ of the second representation 120 of the intruder 115 may be generated. In this example the second representation 120 of the intruder is moving along a straight flight path denoted 121 in FIG. 1b.

By observing differences between two or more images collected by the sensor at different times the rate of change of the direction to the intruder can be measured. The measurement may be done by a filter such as an Extended Kalman Filter using Modified Spherical Coordinates.

The velocity of the respective minimum- and maximum intruders is set to:

$$\dot{x} = -\frac{r}{TTG}\cos(Az)\cos(El) - r\sin(Az)\cos(El)A\dot{z} - r\cos(Az)\sin(El)\dot{El}$$

$$\dot{y} = -\frac{r}{TTG}\sin(Az)\cos(El) + r\cos(Az)\cos(El)A\dot{z} - r\sin(Az)\sin(El)\dot{El}$$

$$\dot{z} = \frac{r}{TTG}\sin(El) - r\cos(El)\dot{El}$$

Where r is set to be $r_{min}$ and $r_{max}$, respectively. $A\dot{z}$ is the rate of change of Az, possibly filtered. $\dot{El}$ is the rate of change of El, possibly filtered. The components, $\dot{x}$, $\dot{y}$, $\dot{z}$ together form velocity vectors $\vec{v}_{min}$ and $\vec{v}_{max}$, using $r_{min}$ and $r_{max}$, respectively.

The spherical velocity uncertainty estimate is given as:

$$u(\vec{v}_{min}) = r_{min}\sqrt{u(A\dot{z})^2\cos^2(El) + u(\dot{El})^2}$$

$$u(\vec{v}_{max}) = r_{max}\sqrt{u(A\dot{z})^2\cos^2(El) + u(\dot{El})^2}$$

Again, u( ) indicates the uncertainty of a measured or calculated variable. Both expressions are approximations of the uncertainty, ignoring higher order terms and TTG uncertainty. The higher order terms and TTG uncertainty may be included for less approximation.

A sense and avoid-system of the platform 100 may be fed with updated data relating to a relative location vector between the own platform and the intruder, namely the platform 100 and the intruder 115, and the relative velocity of the intruder, so as to determine whether a course direction change is necessary to perform or not. According to an aspect of the invention only two sets of data is transferred from the arrangement according to the invention to the sense and avoid-system of the platform 100. The first set of data may comprise information about $\vec{r}_{min}$ and $\vec{v}_{min}$ and their respective uncertainties. The second set of data comprises information about $\vec{r}_{max}$ and $\vec{v}_{max}$ and their respective uncertainties.

Advantageously only two sets of data is fed to the sense and avoid-system on-board the platform 100 instead of similar sets of data corresponding to a plurality ranges along the axis 101.

Figure 2:
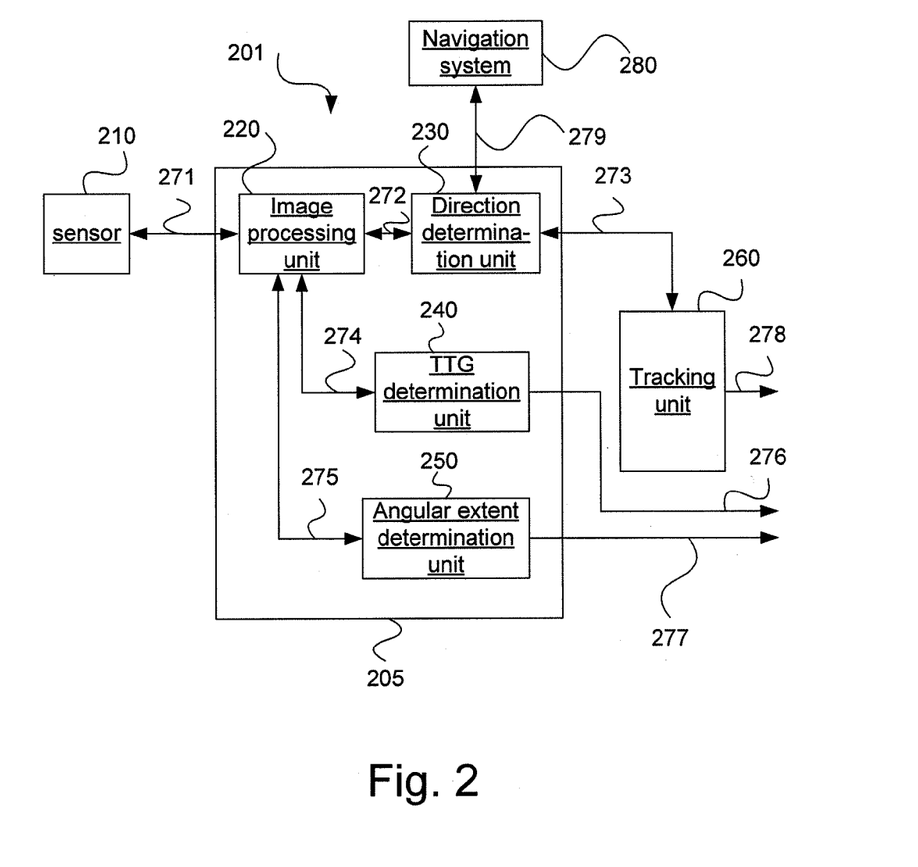
FIG. 2 schematically illustrates a sub-system of an arrangement according to an aspect of the present invention.
Figure 3:
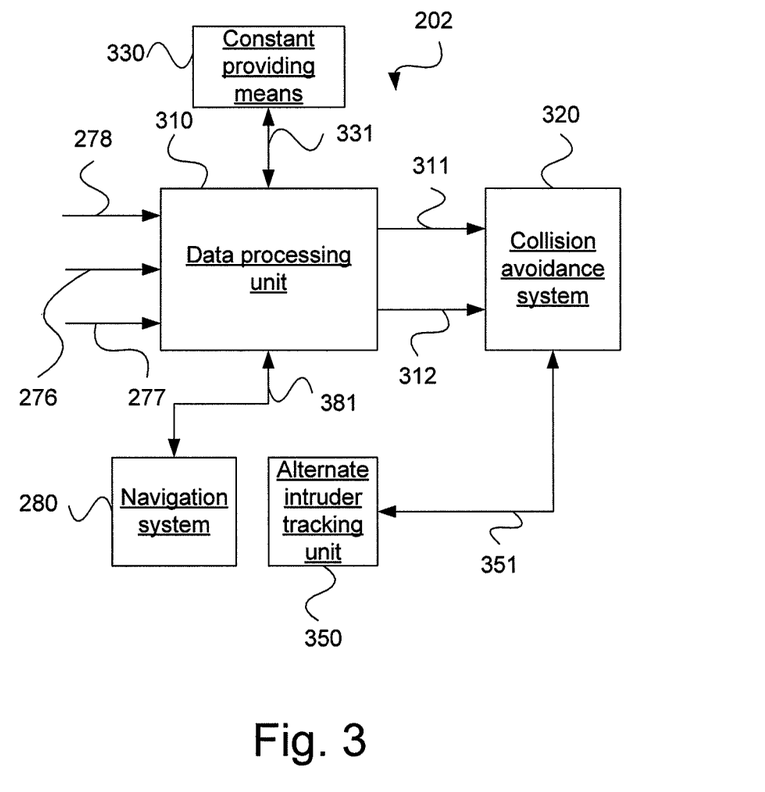
FIG. 3 schematically illustrates a sub-system of an arrangement according to an aspect of the present invention.

With reference to FIG. 2 there is illustrated a sub-system 201 of the arrangement according to an aspect of the invention. The subsystem 201 is arranged to output data signals to a sub-system illustrated with reference to FIG. 3 depicted below.

The sub-system 201 is connectable to a sensor 210. The sensor 210 may be a logical sensor. The sensor 210 may be a passive sensor, such as a digital camera, video camera or IR-camera. The sensor 210 may be an analogue or digital sensor. The sensor 210 is arranged to generate a number of images of the environment of the platform 100. The sensor 210 may be set to generate images by a desired frame rate, such as e.g. 10 frames/second.

The sensor 210 is arranged for communication with a data processing unit 205 via a link 271. The sensor 210 is arranged to output an image data signal comprising image data corresponding to a generated image, such as a signal comprising digital data of an image generated by the sensor 210, via the link 271 to the data processing unit 205.

The data processing unit 205 comprises an image processing unit 220. The image processing unit 220 is arranged to receive the image data signal from the sensor 210. The image processing unit 220 is arranged to process the received image data signal so as to generate a corresponding set of image data. The generated set of image data may be stored in an internal memory of the image processing unit 220.

The image processing unit 220 is arranged to output a signal comprising the image data set to a direction determination unit 230 via a link 272. The direction determination unit 230 is arranged to determine the azimuth angle Az and the elevation angle El. The azimuth angle Az is generated on basis of the image data set and own-ship position data provided by a navigation system 280 of the platform 100. The own-ship position information data is provided to the positioning determination unit 230 via a link 279. Alternatively the navigation system is arranged to provide relevant information comprising attitudes and velocities of the own ship. The elevation angle El is generated on basis of the image data set and own-ship position data provided by a navigation system 280.

The azimuth angle and elevation angle are together indicative for the line 101 illustrated with reference to FIG. 1b.

The Azimuth angle Az and Elevation angle El are sent via the link 273 to the tracking unit 260. In the tracking unit 260 a known filtering technique such as an Extended Kalman Filter is applied to the Az and El inputs over time to obtain their respective rates of change which are denoted $\dot{A}z$ and $\dot{E}l$, respectively. The tracking unit sends Az, El, $\dot{A}z$ and $\dot{E}l$ via the link 278 to the second sub system 202. I particular the data is sent to the processing unit 310.

The image processing unit 220 is arranged to output a signal comprising the image data set to a TTG determination unit 240 via a link 274. The TTG determination unit 240 is arranged to determine a value corresponding to TTG. This may be performed by processing at least two or more sets of image data provided by the image processing unit 220. The two or more sets of image data correspond to images generated at a first time point and a second or more time points, respectively, wherein the first and following time point are sufficiently spaced in time for allowing generation of relevant data based upon image data sets corresponding to these two or more successive images.

The image processing unit 220 is arranged to output a signal comprising the image data set to an angular extent determination unit 250 via a link 275. The angular extent determination unit 250 is arranged to determine the angular extent δ of the intruder viewed from the own-ship 100. The angular extent is illustrated in FIG. 1b. The angular extent δ is determined on basis on the provided set of image data.

With reference to FIG. 3 there is illustrated a second sub-system 202 of the arrangement according to an aspect of the invention. The second subsystem 202 is arranged to receive data signals from the first sub-system 201 illustrated with reference to FIG. 2 depicted above.

The second sub-system 202 comprises a data processing unit 310. The data processing unit 310 is arranged for communication with the navigation unit 280 via a link 381. The navigation unit 280 is arranged to provide information about current attitude and velocity of the own-ship relative to an earth fixed reference point. The attitudes are used to relate different camera images to a common reference frame allowing for platform gyration. The velocity is required for the aforementioned algorithms, and for subsequent collision avoidance by the collision avoidance system 320 of the sense-and-avoid system.

The data processing unit 310 is arranged for communication with a constant providing means 330 for providing information relevant to calculations of the data processing unit 310. The provided information comprises information regarding limitations of the calculations of the data processing unit 310.

The constant providing means 330 is arranged to provide:

$\delta_{pixel}$, which is a value indicating the minimum angular extent that a detected intruder could have, e.g. the angle that a single pixel in a CCD could cover;

$b_{min}$, which is a value indicating minimum intruder span; and $v_{i,max}$, which is indicating a maximum speed of the intruder.

The given constants $\delta pixel$, $b_{min}$ and $V_{i,max}$ are preset and stored in an internal memory of the constant providing means 330. These and other limitations may be used for facilitating determination of maximum and minimum intruder range, and determination of maximum and minimum intruder velocity.

The data processing unit 310 is arranged for communication with a collision avoidance system 320 via a first intruder data link 311. The data processing unit 310 is arranged for communication with a collision avoidance system 320 via a second intruder data link 312.

The collision avoidance system 320 is a system which is arranged to receive range data from the arrangement and determine how to avoid a future possible collision and, when necessary, automatically control the platform to avoid the possible collision by manoeuvring the platform in such a way a safe generated escape path is followed.

The collision avoidance system 320 may also be arranged for communication with other providers of intruder information, such as a radar, lidar, sonar or similar here collectively referred to as alternate intruder tracking units. The alternate intruder tracking unit 350 is arranged to provide measured information relating to the relative location between the platform and the intruder. The alternate intruder tracking unit 350 is arranged to provide velocity information of the intruder. In this way the collision avoidance system 320 may perform an alternative determination regarding how to avoid a future possible collision and, when necessary, automatically control the platform to avoid the possible collision by manoeuvring the platform in such a way a safe generated escape path is followed. There may be a multitude of alternate intruder tracking units.

The first sub-system 201 and the second 202 are connectable. e.g. via the links 276, 277 and 278. The first sub-system 201 and the second sub-system 202 constitute the arrangement according to the invention. Thus the arrangement, according to an aspect of the invention, comprises the first sub-system 201 and the second sub-system 202, namely the components 205, 260, 310 and 330. The arrangement is connectable to the sensor 210, navigation unit 280, and the collision avoidance system 320. The arrangement is advantageously detachable connected to the collision avoidance system 320.

Figures 4A, 4B:
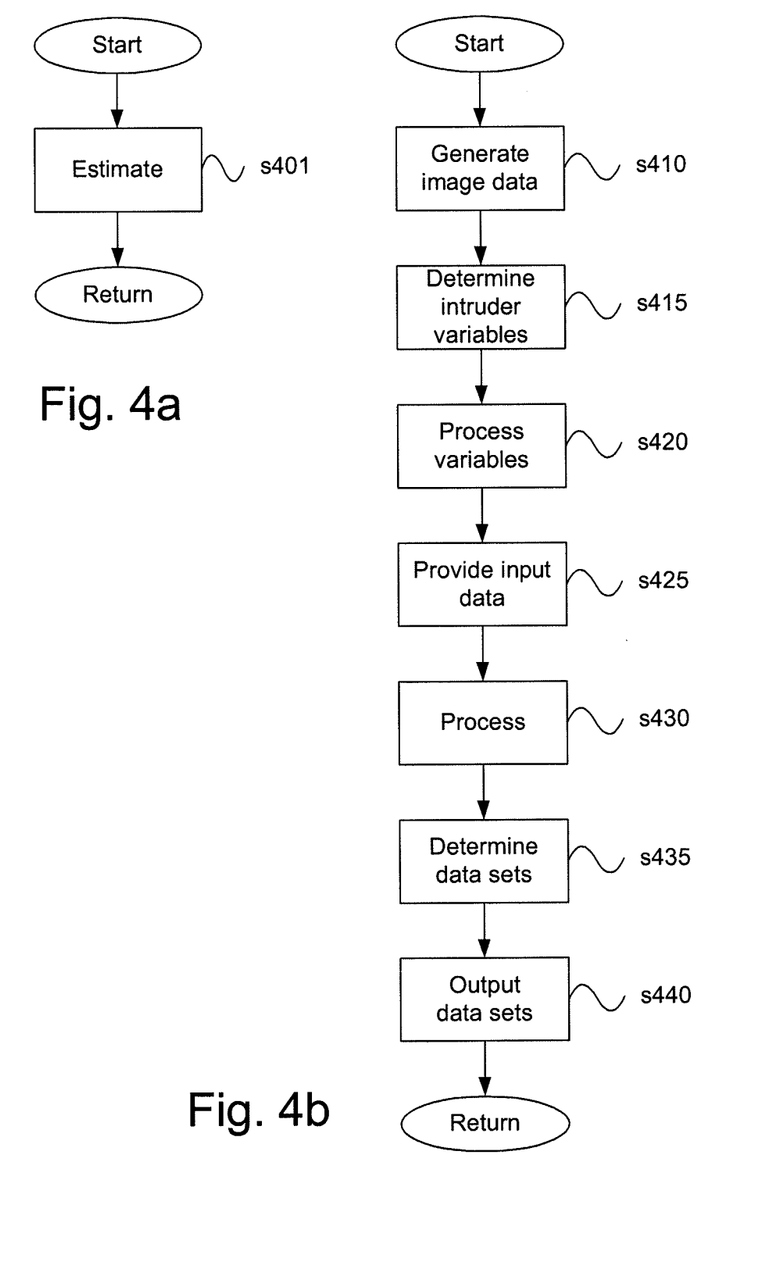
FIG. 4a schematically illustrates a method for determining, from a platform, at least one parameter of an intruder according to an aspect of the present invention.
FIG. 4b schematically illustrates a method for determining, from a platform, at least one parameter of an intruder depicted in greater detail, according to an aspect of the present invention.

With reference to FIG. 4a there is illustrated a method for estimating, from a platform, at least one parameter of an intruder, comprising the steps of:

generating consecutive frames of image data at different times of said intruder by means of at least one passive sensor;

determining a direction from the platform to the intruder on the basis of the generated consecutive frames of image data;

estimating a time period remaining until a potential collision between the platform and the intruder;

estimating an angular extent of the intruder, as viewed by the passive sensor, on the basis of the image data; and estimating a first relative location vector to a minimum intruder associated with the intruder; and/or estimating a second relative location vector to a maximum intruder associated with the intruder.

With reference to FIG. 4b there is illustrated a flowchart of the inventive method depicted in greater detail, according to an aspect of the invention.

The method comprises a first method step s410. The method step s410 comprises the step of generating image data. The image data may be generated by an image generated by a passive sensor, such as a video camera onboard a platform. The image data may comprise information about a plurality of, in time successive, generated images. After the method step s410 a method step s415 is performed.

The method step s415 comprises the step of determining intruder variables. Examples of intruder variables are: azimuth angle Az, intruder elevation angle El, time period TTG and intruder angular extent δangle. These variables are depicted in greater detail with reference to FIG. 1b.

The method step s415 comprises a plurality of sub-steps. One sub-step is to determine a current azimuth angle Az from the own-ship to an intruder. The azimuth angle Az may be determined relative a NED coordinate system. The azimuth angle is determined by processing the image data.

Another sub-step is to determine current intruder elevation angle El from the own-ship to an intruder. The intruder elevation angle El may be determined relative a NED coordinate system. The elevation angle El is determined by processing the image data.

Yet another sub-step is to determine a time period TTG. The time period TTG is indicating a time period ranging from a current time moment to a time moment when a possible collision between the own-ship and the intruder may take place. The time period TTG is determined by processing image data associated with at least two different generated images, which are separated in time. The time period TTG may be determined by processing a first generated image corresponding to a first point in time T1 and by processing a second generated image corresponding to a second point in time T2.

Another sub-step is to determine an intruder angular extent δangle. The intruder angular extent δangle is determined by processing the image data. After the method step s415 a method step s420 is performed.

The method step s420 comprises the step of processing intruder variables. The method step s420 comprises two sub-steps. A first sub-step is to determine the derivative of the generated azimuth angle Az with respect of time. The time derivative of the generated azimuth angle Az is denoted $\dot{A}z$. A second sub-step is to determine the derivative of the generated elevation angle El with respect of time. The time derivative of the generated elevation angle El is denoted $\dot{E}l$. After the method step s420 a method step s425 is performed.

The method step s425 comprises the step of providing input data. The input data may be constants such as δpixel, $b_{min}$, and $V_{i,max}$, which are depicted in greater detail with reference to FIG. 3. After the method step s425 a method step s430 is performed.

The method step s430 comprises the step of processing the determined intruder variables and the provided input data so as to allow determination of two sets of output intruder data, namely a first set of intruder data comprising $\vec{r}_{min}$ and $\vec{v}_{min}$ and their respective uncertainties, and a second set of intruder data comprising $\vec{r}_{max}$ and $\vec{v}_{max}$ and their respective uncertainties. The first set of intruder data comprising $\vec{r}^{min}$ and $\vec{v}_{min}$ is associated with the minimum intruder 110 as illustrated in FIG. 1b. The second set of intruder data comprising $\vec{r}_{min}$ and $\vec{v}_{min}$ is associated with the maximum intruder 120 as illustrated in FIG. 1b.

The method step s435 comprises the step of determining the two sets of output intruder data. Herein the first set of intruder data comprising $\vec{r}_{min}$ and $\vec{v}_{min}$, and a second set of intruder data comprising $\vec{r}_{max}$ and $\vec{v}_{max}$ are determined. After the method step s435 a method step s440 is performed.

The method step s440 comprises the step of outputting the first and second set of intruder data. The first and second set of intruder data may be output to a sense and avoid-system. After the method step s440 the method ends.

Figure 5:
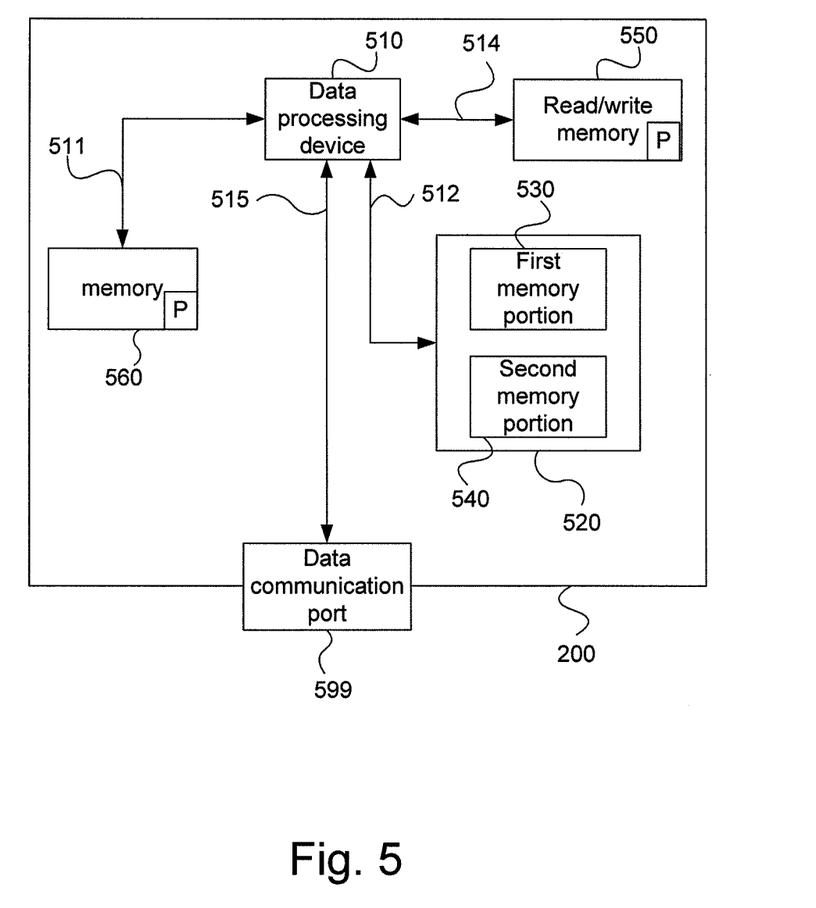
FIG. 5 schematically illustrates a data processing unit according to an aspect of the present invention.

With reference to FIG. 5, a diagram of one embodiment of the electronic data processing unit 200 is shown. The electronic data processing unit 200 is also referred to as apparatus. Any of the units depicted with reference to FIGS. 2 and 3 may comprise the apparatus. The apparatus comprises a non-volatile memory 520, a data processing device 510 and a read/write memory 550. Non-volatile memory 520 has a first memory portion 530 wherein a computer program, such as an operating system, is stored for controlling the function of the apparatus. Further, the apparatus comprises a bus controller, a serial communication port, I/O-means, an A/D-converter, a time date entry and transmission unit, an event counter and an interrupt controller (not shown). Non-volatile memory 520 also has a second memory portion 540.

A computer program P comprising routines for estimating at least one parameter of an intruder, may be stored in an executable manner or in a compressed state in a separate memory 560 and/or in read/write memory 550. The memory 560 is a non-volatile memory, such as a flash memory, an EPROM, an EEPROM or a ROM. The memory 560 is a computer program product. The memory 550 is a computer program product.

When it is stated that the data processing device 510 performs a certain function it should be understood that the data processing device 510 performs a certain part of the program which is stored in the separate memory 560, or a certain part of the program which is stored in the read/write memory 550.

The data processing device 510 may communicate with a data communications port 599 by means of a data bus 515. The non-volatile memory 520 is adapted for communication with the data processing device 510 via a data bus 512. The separate memory 560 is adapted for communication with the data processing device 510 via a data bus 511. The read/write memory 550 is adapted for communication with the data processing device 510 via a data bus 514.

Image data comprising information about the intruder is received from the passive sensor and stored in the memory 550 or 560.

When data, such as image data, is received on the data port 599 from a passive sensor it is temporarily stored in the second memory portion 540. When the received input data has been temporarily stored, the data processing device 510 is set up to perform execution of code in a manner described herein. The processing device 510 is arranged to perform routines so as to estimating at least one parameter of an intruder and to output the result to a collision avoidance system.

Parts of the methods described herein can be performed by the apparatus by means of the data processing device 510 running the program stored in the separate memory 560 or the read/write memory 550. When the apparatus runs the program, parts of the methods described herein are executed.

The data processing unit 205 and the data processing unit 310 may comprise the apparatus 200. Alternatively, the arrangement according to the invention, namely the sub-systems 201 and 202, may be realized in the form of apparatus 200 comprising software for performing image processing and to estimate range to and velocity of an intruder regarding a minimum- and a maximum intruder thereof.

An aspect of the invention relates to a computer programme comprising a programme code for estimating, from a platform, at least one parameter of an intruder, comprising the steps of:
generating consecutive frames of image data at different times of said intruder by means of at least one passive sensor;
determining a direction from the platform to the intruder on the basis of the generated consecutive frames of image data;
estimating a time period remaining until a potential collision between the platform and the intruder;
estimating an angular extent of the intruder, as viewed by the passive sensor, on the basis of the image data; and
estimating a first relative location vector to a minimum intruder (110) associated with the intruder, and/or
estimating a second relative location vector to a maximum intruder (120) associated with the intruder, when said computer programme is run on a computer or the control unit 200.

An aspect of the invention relates to a computer programme product comprising a program code stored on a, by a computer readable, media for estimating, from a platform, at least one parameter of an intruder, comprising the steps of:
generating consecutive frames of image data at different times of said intruder by means of at least one passive sensor;
determining a direction from the platform to the intruder on the basis of the generated consecutive frames of image data;
estimating a time period remaining until a potential collision between the platform and the intruder;
estimating an angular extent of the intruder, as viewed by the passive sensor, on the basis of the image data; and
estimating a first relative location vector to a minimum intruder (110) associated with the intruder; and/or
estimating a second relative location vector to a maximum intruder (120) associated with the intruder, when said computer programme is run on a computer or the control unit 200.

An aspect of the invention relates to a computer programme product directly storable in an internal memory into a computer, comprising a computer programme for estimating, from a platform, at least one parameter of an intruder, comprising the steps of:
generating consecutive frames of image data at different times of said intruder by means of at least one passive sensor;
determining a direction from the platform to the intruder on the basis of the generated consecutive frames of image data;
estimating a time period remaining until a potential collision between the platform and the intruder;
estimating an angular extent of the intruder, as viewed by the passive sensor, on the basis of the image data; and
estimating a first relative location vector to a minimum intruder (110) associated with the intruder; and/or
estimating a second relative location vector to a maximum intruder (120) associated with the intruder, when said computer programme is run on a computer or the control unit 200.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method for estimating, from a platform, at least one parameter of an intruder, the method comprising:
generating consecutive frames of image data at different times of said intruder with at least one passive sensor arranged at the platform;
determining a direction from the platform to the intruder based on the generated consecutive frames of image data;
estimating a time period remaining until a potential collision between the platform and the intruder;
estimating an angular extent of the intruder, as viewed by the passive sensor from the platform, based on the image data, wherein the angular extent comprises an angular view size of the intruder;
generating a potential minimum representation of the intruder having the angular extent and a potential maximum representation of the intruder having the angular extent along the direction at one time;
estimating a first relative location vector to the potential minimum representation of the intruder corresponding to a minimum range to the intruder along the direction; and/or
estimating a second relative location vector to the potential maximum representation of the intruder corresponding to a maximum range to the intruder along the direction, wherein estimating the first relative location vector and the second relative location vector is based on at least one of the time period and the angular extent; and
estimating a first speed vector of the minimum representation of the intruder; and/or
estimating a second speed vector of the maximum representation of the intruder.

2. The method according to claim 1, further comprising:
determining a relative location vector interval to the intruder based on said first relative location vector and said second relative location vector.

3. The method according to claim 1, further comprising:
providing at least one of the first relative location vector and said second relative location vector to a sense and avoid system onboard the platform so as to prevent a collision between said platform and said intruder.

4. The method according to claim 1, further comprising:
estimating said first relative location vector to the first representation of the intruder based on a predetermined width associated with the first representation of the intruder, a smallest angular extent for which the passive sensor can detect an object, and said estimated angular extent of the intruder.

5. The method according to claim 1, further comprising:
estimating said second relative location vector to the second representation of the intruder based on said estimated time period remaining until a potential collision between the platform and intruder.

6. The method according to claim 1, further comprising:
estimating said second relative location vector to the second representation of the intruder based on a predetermined maximum width of intruders and said estimated angular extent of the intruder.

7. A computer program product, comprising:
a non-transitory computer readable medium; and
computer program code recorded on the computer readable medium and executable by a processor for, from a platform, estimating at least one parameter of an intruder utilizing a method comprising
generating consecutive frames of image data at different times of said intruder with at least one passive sensor arranged at the platform;
determining a direction from the platform to the intruder based on the generated consecutive frames of image data;
estimating a time period remaining until a potential collision between the platform and the intruder;
estimating an angular extent of the intruder, as viewed by the passive sensor from the platform, based on the image data, wherein the angular extent comprises an angular view size of the intruder;
generating a potential minimum representation of the intruder having the angular extent and a potential maximum representation of the intruder having the angular extent along the direction at one time;
estimating a first relative location vector to the potential minimum representation of the intruder corresponding to a minimum range to the intruder along the direction; and/or
estimating a second relative location vector to the potential maximum representation of the intruder corresponding to a maximum range to the intruder along the direction, wherein estimating the first relative location vector and the second relative location vector is based on at least one of the time period and the angular extent; and
estimating a first speed vector of the minimum representation of the intruder; and/or
estimating a second speed vector of the maximum representation of the intruder.

8. An arrangement for estimating, from a platform, at least one parameter of an intruder, the arrangement comprising:
a frame generator configured to generate consecutive frames of image data at different times of said intruder with at least one passive sensor arranged at the platform;
a direction determining module configured to determine a direction from the platform to the intruder based on the generated consecutive frames of image data;
a first estimator configured to estimate a time period remaining until a potential collision between the platform and intruder;
a second estimator configured to estimate an angular extent of the intruder, as viewed by the passive sensor from the platform, based on the image data, wherein the angular extent comprises an angular view size of the intruder;
a representation generator configured to generate a potential minimum representation of the intruder having the angular extent and a potential maximum representation of the intruder having the angular extent along the direction at one time;
a third estimator configured to estimate the potential minimum relative location vector to a first representation of the intruder corresponding to a minimum range to the intruder along the direction, and/or
a fourth estimator configured to estimate the potential maximum relative location vector to a second representation of the intruder corresponding to a maximum range to the intruder along the direction, wherein estimating the first relative location vector and the second relative location vector is based on at least one of the time period and the angular extent; and
a fifth estimator configured to estimate a first speed vector of the minimum representation of the intruder; and/or
a sixth estimator configured to estimate a second speed vector of the maximum representation of the intruder.

9. The arrangement according to claim 8, further comprising:
a module configured to determine a relative location vector interval to an intruder based on said first relative location vector and said second relative location vector.

10. The arrangement according to claim 8, further comprising:
a locator configured to provide at least one of the first relative location vector and said second relative location vector to a sense and avoid system onboard the platform so as to prevent a collision between said platform and said intruder.

11. A platform, comprising:
a vehicle; and
an arrangement on said vehicle for estimating at least one parameter of an intruder, the arrangement comprising:
a frame generator configured to generate consecutive frames of image data at different times of said intruder with at least one passive sensor arranged at the platform;
a direction determining module configured to determine a direction from the platform to the intruder based on the generated consecutive frames of image data;
a first estimator configured to estimate a time period remaining until a potential collision between the platform and intruder;
a second estimator configured to estimate an angular extent of the intruder, as viewed by the passive sensor from the platform, based on the image data, wherein the angular extent comprises an angular view size of the intruder;

a representation generator configured to generate a potential minimum representation of the intruder having the angular extent and a potential maximum representation of the intruder having the angular extent along the direction at one time;

a third estimator configured to estimate the potential minimum relative location vector to a first representation of the intruder corresponding to a minimum range to the intruder along the direction, and/or a fourth estimator configured to estimate the potential maximum relative location vector to a second representation of the intruder corresponding to a maximum range to the intruder along the direction, wherein estimating the first relative location vector and the second relative location vector is based on at least one of the time period and the angular extent; and a fifth estimator configured to estimate a first speed vector of the minimum representation of the intruder; and/or a sixth estimator configured to estimate a second speed vector of the maximum representation of the intruder.

12. A method for estimating, from a platform, at least one parameter of an intruder, the method comprising:

generating consecutive frames of image data at different times of said intruder with at least one passive sensor arranged at the platform;

determining a direction from the platform to the intruder based on the generated consecutive frames of image data;

estimating an angular extent of the intruder, as viewed by the passive sensor from the platform, based on the image data, wherein the angular extent comprises an angular view size of the intruder;

generating a potential minimum representation of the intruder having the angular extend along the direction at one time;

estimating a first relative location vector to the potential minimum representation of the intruder corresponding to a minimum range to the intruder along the direction associated with the intruder based on the estimated angular extent of the intruder and based on a minimum width, as viewed by the sensor, associated with the minimum representation of the intruder; and estimating a first speed vector of the minimum representation of the intruder.

13. The method according to claim 12, further comprising:

estimating a second relative location vector to a maximum second representation of the intruder corresponding to a maximum range to the intruder along the direction associated with the intruder.

14. The method according to claim 13, wherein the estimation of the second relative location vector is based on the estimated angular extent of the intruder.

15. The method according to claim 13, further comprising:

estimating a time period remaining until a potential collision between the platform and the intruder, wherein the estimation of the second relative location vector is based on the estimated time period remaining until the potential collision between the platform and the intruder.

16. A computer program product, comprising:

a non-transitory computer readable medium; and computer program code recorded on the computer readable medium and executable by a processor for, from a platform, estimating at least one parameter of an intruder utilizing a method comprising generating consecutive frames of image data at different times of said intruder with at least one passive sensor arranged at the platform;

determining a direction from the platform to the intruder based on the generated consecutive frames of image data;

estimating an angular extent of the intruder, as viewed by the passive sensor from the platform, based on the image data, wherein the angular extent comprises an angular view size of the intruder;

generating a potential minimum representation of the intruder having the angular extent along the direction at one time;

estimating a first relative location vector to the potential minimum representation of the intruder corresponding to a minimum range to the intruder along the direction associated with the intruder based on the estimated angular extent of the intruder and based on a minimum width, as viewed by the sensor, associated with the minimum representation of the intruder; and estimating a first speed vector of the minimum representation of the intruder.

17. An arrangement for estimating, from a platform, at least one parameter of an intruder, the arrangement comprising:

a frame generator configured to generate consecutive frames of image data at different times of said intruder with at least one passive sensor arranged at the platform;

a direction determining module configured to determine a direction from the platform to the intruder based on the generated consecutive frames of image data;

a first estimator configured to estimate an angular extent of the intruder from the platform, as viewed by the passive sensor, based on the image data, wherein the angular extent comprises an angular view size of the intruder;

a representation generator configured to generate a potential minimum representation of the intruder having the angular extent and a potential maximum representation of the intruder having the angular extent along the direction at one time;

a second estimator configured to estimate a first relative location vector to the potential minimum representation of the intruder corresponding to a minimum range to the intruder along the direction based, and/or a third estimator configured to estimate a second relative location vector to the potential maximum representation of the intruder corresponding to a maximum range to the intruder along the direction based on the estimated angular extent of the intruder and based on a minimum width associated with the minimum representation of the intruder from the platform, wherein the minimum width comprises a width of the intruder; and a fourth estimator configured to estimate a first speed vector of the minimum representation of the intruder; and/or a fifth estimator configured to estimate a second speed vector of the maximum representation of the intruder.

18. A platform, comprising:

a vehicle; and an arrangement on said vehicle for estimating at least one parameter of an intruder, the arrangement comprising:

a frame generator configured to generate consecutive frames of image data at different times of said intruder with at least one passive sensor arranged at the platform;

a direction determining module configured to determine a direction from the platform to the intruder based on the generated consecutive frames of image data;

a first estimator configured to estimate an angular extent of the intruder from the platform, as viewed by the passive sensor, based on the image data, wherein the angular extent comprises an angular view size of the intruder;

a representation generator configured to generate a potential minimum representation of the intruder having the angular extent and a potential maximum representation of the intruder having the angular extent along the direction at one time;

a second estimator configured to estimate a first relative location vector to the potential minimum representation of the intruder corresponding to a minimum range to the intruder along the direction based, and/or a third estimator configured to estimate a second relative location vector to the potential maximum representation of the intruder corresponding to a maximum range to the intruder along the direction based on the estimated angular extent of the intruder and based on a minimum width associated with the minimum representation of the intruder from the platform, wherein the minimum width comprises a width of the intruder; and a fourth estimator configured to estimate a first speed vector of the minimum representation of the intruder; and/or a fifth estimator configured to estimate a second speed vector of the maximum representation of the intruder.

* * * * *